United States Patent
Piper et al.

(10) Patent No.: US 8,972,132 B2
(45) Date of Patent: Mar. 3, 2015

(54) METHOD OF CONTROLLING A TRANSMISSION OF A VEHICLE

(71) Applicant: GM Global Technology Operations LLC, Detroit, MI (US)

(72) Inventors: Eric Piper, Fenton, MI (US); Alexander K. Rustoni, Oxford, MI (US); John Janczak, Commerce Township, MI (US); Samantha Victoria Lado, Pittsfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 13/901,671

(22) Filed: May 24, 2013

(65) Prior Publication Data
US 2014/0350805 A1    Nov. 27, 2014

(51) Int. Cl.
*G06F 7/00* (2006.01)
*B60W 10/11* (2012.01)
*B60W 10/04* (2006.01)

(52) U.S. Cl.
CPC .............. *B60W 10/11* (2013.01); *B60W 10/04* (2013.01)
USPC ................. 701/66; 701/64; 477/120; 477/144

(58) Field of Classification Search
CPC . B60W 20/30; B60W 2540/11; B60W 10/10; B60W 10/101; B60W 10/103; B60W 10/105; B60W 10/107; B60W 10/108; B60W 10/109; B60W 10/11; B60W 10/111
See application file for complete search history.

(56) References Cited

U.S. PATENT DOCUMENTS

| | | | | |
|---|---|---|---|---|
| 5,738,605 | A * | 4/1998 | Fliearman et al. | 477/108 |
| 6,389,351 | B1 * | 5/2002 | Egawa et al. | 701/93 |
| 7,010,406 | B2 * | 3/2006 | Sah et al. | 701/55 |

* cited by examiner

*Primary Examiner* — David D Le
(74) *Attorney, Agent, or Firm* — Quinn Law Group, PLLC

(57) ABSTRACT

A method of controlling a transmission includes detecting an occurrence of a downshift in the transmission from a first gear ratio to a second gear ratio. A determination is made whether the vehicle is operating within a freeway speed range, and whether an accelerator pedal is depressed at least a minimum percentage of a fully depressed position. When the downshift from the high gear ratio to the low gear ratio is detected, the vehicle is operating within the freeway speed range, and the accelerator pedal is depressed at least the minimum percentage of the fully depressed position, a countdown timer is started to count down from a pre-defined time to zero. An upshift of the transmission from the second gear ratio to the first gear ratio is restricted while the countdown timer defines a time that is greater than zero.

20 Claims, 1 Drawing Sheet

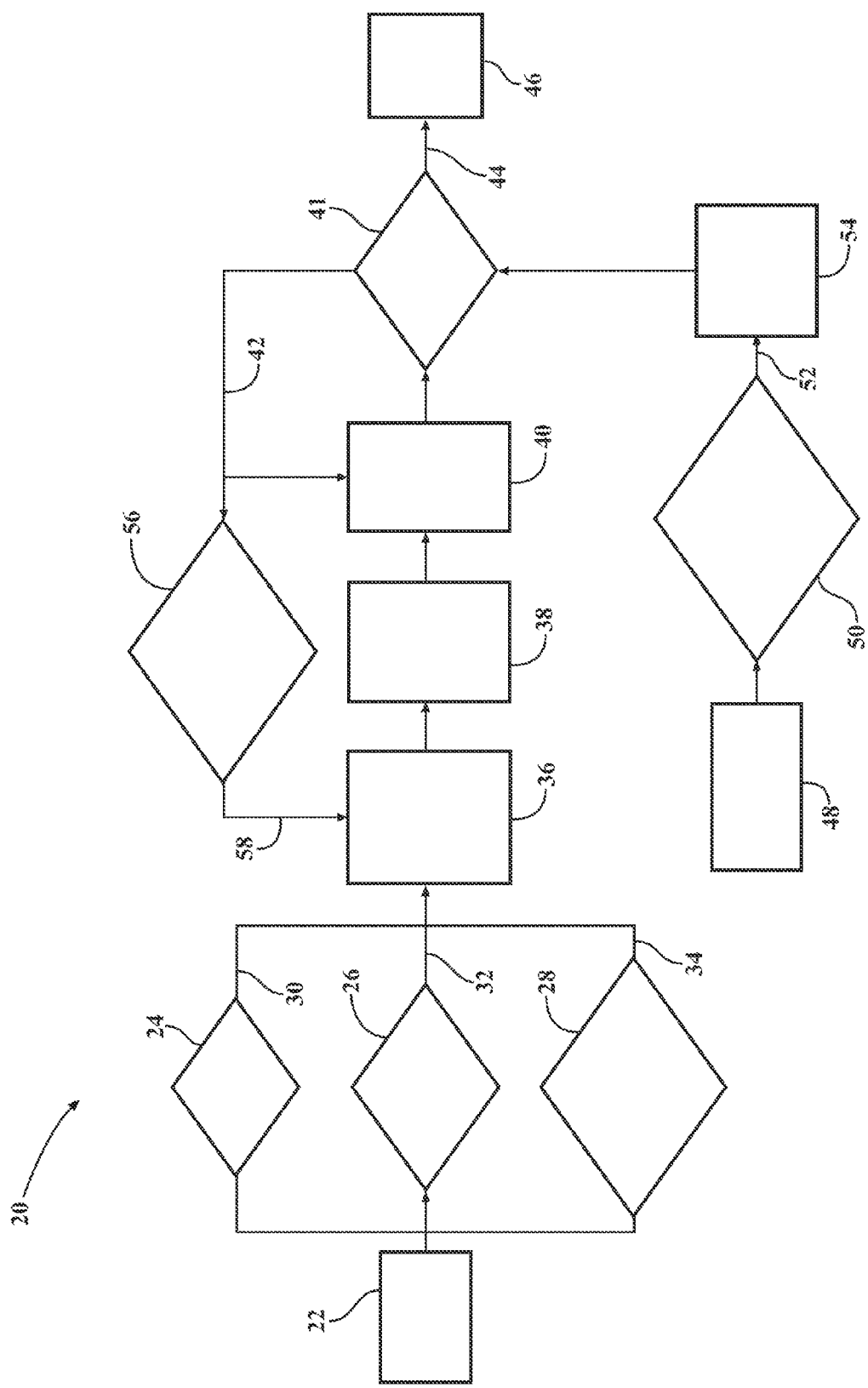

METHOD OF CONTROLLING A TRANSMISSION OF A VEHICLE

TECHNICAL FIELD

The invention generally relates to a method of controlling a transmission of a vehicle.

BACKGROUND

Transmissions, such as but not limited to automatic transmissions or hybrid transmissions, define a plurality of different gear ratios, and automatically changes between them in response to the current driving conditions and/or driving requests, such as but not limited to accelerating, decelerating, depressing an accelerator pedal, etc. Under certain driving conditions, such as but not limited to a sudden acceleration request, the transmission may downshift to a lower gear ratio to provide a higher torque capability. Such downshifts may require multiple gear and clutch state changes. Upon completion of the acceleration request, the transmission may upshift back to a more appropriate speed/fuel efficient gear ratio. When such acceleration requests are continually repeated, the continual upshifting and downshifting of the transmission may lower the driving experience of the vehicle.

SUMMARY

A method of controlling a transmission of a vehicle is provided. The method includes detecting an occurrence of a downshift in the transmission from a first gear ratio to a second gear ratio. The first gear ratio is a higher gear ratio than the second gear ratio. A determination is made whether the vehicle is operating within a freeway speed range, or is not operating in the freeway speed range. A determination is made whether an accelerator pedal is depressed at least a minimum percentage of a fully depressed position, or is not depressed at least the minimum percentage of the fully depressed position. When the downshift from the first gear ratio to the second gear ratio is detected, the vehicle is operating within the freeway speed range, and the accelerator pedal is depressed at least the minimum percentage of the fully depressed position, a countdown timer is started to count down from a pre-defined time to zero. An upshift of the transmission from the second gear ratio to the first gear ratio is restricted while the countdown timer defines a time that is greater than zero.

A method of operating a vehicle is also provided. The method includes setting a countdown timer to define a time equal to zero. A downshift in a transmission from a first gear ratio to a second gear ratio is detected. The first gear ratio is a higher gear ratio than the second gear ratio. A speed of the vehicle is continually sensed. A determination is made whether the vehicle is operating within a freeway speed range, or is not operating in the freeway speed range, based upon the sensed speed of the vehicle. A position of an accelerator pedal is continually sensed. A determination is made whether the accelerator pedal is depressed at least a minimum percentage of a fully depressed position, or is not depressed at least the minimum percentage of the fully depressed position, based upon the sensed position of the accelerator pedal. The countdown timer is set to define a time equal to a pre-defined time. The pre-defined time is a time greater than zero. When the downshift from the first gear ratio to the second gear ratio is detected, the vehicle is operating within the freeway speed range, and the accelerator pedal is depressed at least the minimum percentage of the fully depressed position, then the countdown timer is started to count down from the pre-defined time to zero. An upshift of the transmission from the second gear ratio to the first gear ratio is restricted while the countdown timer defines a time that is greater than zero. The upshift of the transmission from the second gear ratio to the first gear ratio is not restricted when the countdown timer defines a time that is equal to zero.

Accordingly, when the vehicle is operating at highway speeds, the accelerator pedal is depressed beyond the minimum percentage of the fully depressed position, and a downshift in the transmission is detected, the countdown timer is started and the transmission is restricted from upshifting until the countdown timer reaches a time of zero. Accordingly, because the transmission is restricted from upshifting after completing the acceleration request, repeated acceleration requests that are made during the countdown period do not require the transmission to downshift to achieve the repeated acceleration requests, thereby improving driving experience of the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flowchart showing a method of controlling a transmission of a vehicle.

DETAILED DESCRIPTION

Those having ordinary skill in the art will recognize that terms such as "above," "below," "upward," "downward," "top," "bottom," etc., are used descriptively for the FIGURE, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to FIG. 1, a method of controlling a transmission of a vehicle is generally shown at 20 in FIG. 1. The transmission may include, but is not limited to, an automatic transmission or a hybrid transmission. The vehicle may include a control module, such as but not limited to a transmission control unit, to control the operation of the transmission. The control module may include a computer and/or processor, and include all software, hardware, memory, algorithms, connections, sensors, etc., necessary to manage and control the operation of the transmission. As such, the method, described below and generally shown in the FIGURE at 20, may be embodied as a program operable on the control module. It should be appreciated that the control module may include any device capable of analyzing data from various sensors, comparing data, making the necessary decisions required to control the operation of the transmission, and executing the required tasks necessary to control the operation of the of the transmission in accordance with the method described below.

The method includes setting a countdown timer to define a time equal to zero, generally indicated by box 22. The countdown timer is a time keeping device, such as a clock, that counts down or backward from a pre-defined time to zero. When the countdown timer is set to define a time equal to zero, the transmission operates as normal.

The control module monitors the operation of the transmission to determine or detect a downshift in the transmission, generally indicated by box 24, from a first gear ratio to a second gear ratio. The first gear ratio is a higher gear ratio than the second gear ratio. However, it should be appreciated that the transmission may define one or more gear ratios between the first gear ratio and the second gear ratio. As such, the first gear ratio and the second gear ratio may be but are not required to be consecutive gear ratios. The control module may detect the downshift in any suitable manner, such as by monitoring the various positions and/or states of the gears, clutches, brakes, etc., to determine which of the different gear ratios the transmission is currently disposed in and identify a shift, e.g., a downshift from the first gear ratio to the second gear ratio.

The control module continuously senses a speed of the vehicle, and a position of an accelerator pedal of the vehicle. The control module may sense the speed of the vehicle in any suitable manner, such as but not limited to the use of a speed sensor. The control module may sense the position of the accelerator pedal in any suitable manner as well, such as but not limited to a position sensor operable to sense movement and/or the position of the accelerator pedal.

The control module uses the sensed speed of the vehicle to determine if the vehicle is operating within a freeway speed range, or is not operating within the freeway speed range, generally indicated by box 26. The freeway speed range may be defined to any desirable speed range. For example, the freeway speed range may be defined to include any vehicle speed between the range of 45 mph and 75 mph. Alternatively, the freeway speed range may be defined as any speed greater than a minimum speed. For example, the freeway speed range may be defined as any speed greater than 45 mph. It should be appreciated that the freeway speed range may differ from the exemplary ranges provided herein.

The control module uses the sensed position of the accelerator pedal to determine if the accelerator pedal is depressed at least a minimum percentage of a fully depressed position, or is not depressed a minimum percentage of a fully depressed position, generally indicated by box 28. It should be appreciated that the accelerator pedal moves between an initial, i.e., not-depressed position, and a fully depressed position. Accordingly, fifty percent depression of the accelerator pedal would correspond to movement of the accelerator pedal halfway between the non-depressed position and the fully depressed position. Similarly, twenty five percent depression of the accelerator pedal would correspond to movement of the accelerator pedal one quarter of the distance between the non-depressed position and the fully depressed position. The minimum percentage may include a percentage value between the range of 0% and 100%. Preferably, however, the minimum percentage is between the range of 50% and 100%. For example, if the minimum percentage is defined to equal a percentage value of 50%, then the control module senses the position of the accelerator pedal to determine if the accelerator pedal is depressed more than 50% of the fully depressed position, i.e., the control module determines if the accelerator pedal is depressed to a position more than halfway between the not-depressed position and the fully depressed position, or if the accelerator pedal is depressed to a position less than halfway between the not-depressed position and the fully depressed position.

When the downshift from the high gear ratio to the low gear ratio is detected, indicated at 30, the vehicle is operating within the freeway speed range, indicated at 32, and the accelerator pedal is depressed at least the minimum percentage of the fully depressed position, indicated at 34, the control module may set the countdown timer to define a time equal to the pre-defined time, generally indicated by box 36. The pre-defined time is a time greater than zero. Preferably, the pre-defined time is between the range of twenty minutes and ten seconds, i.e., the pre-defined time is less than twenty minutes and greater than ten seconds. More preferably, the pre-defined time is between the range of two minutes and thirty seconds, i.e., the pre-defined time is less than two minutes and greater than thirty seconds.

Once the countdown timer is set to the pre-defined time, the control module may then start the countdown timer to count down from the pre-defined time to zero, generally indicated by box 38. While the countdown timer defines a time that is greater than zero, an upshift of the transmission, from the second gear ratio to the first gear ratio, is restricted, generally indicated by 40. By restricting the upshift from the second gear ratio to the first gear ratio, the transmission is urged to maintain operation in the second gear ratio. The restriction lasts as long as the countdown timer defines a time greater than zero. Accordingly, the control module determines if the countdown timer continues to define a time greater than zero, generally indicated by box 41. If the countdown timer defines a time greater than zero, indicated at 42, then the control module continues to restrict the transmission from upshifting, generally indicated by box 40. Once the control module determines that the countdown timer defines a time equal to zero, generally indicated at 44, then the restriction is removed, and the transmission may operate as normal, generally indicated by box 46. Accordingly, the upshift of the transmission, from the second gear ratio to the first gear ratio, is not restricted when the countdown timer defines a time that is equal to zero.

The restriction may be implemented as an absolute block to prevent the transmission from upshifting from the second gear ratio to the first gear ratio, or may alternatively be implemented as a limitation that makes it less desirable to perform the upshift from the second gear ratio to the first gear ratio. For example, the control module may normally initiate the upshift from the second gear ratio to the first gear ratio based upon a cost associated with operating the vehicle in the second gear ratio at the current operating conditions, e.g., a current speed of the vehicle, relative to a cost associated with operating the vehicle in the first gear ratio at the current operating conditions, e.g., the current speed of the vehicle. The cost of operating the vehicle may be based upon several factors, including but not limited to the fuel efficiency of the vehicle in the different gear ratios at the current operating conditions of the vehicle.

As such, restricting the upshift of the transmission from the second gear ratio to the first gear ratio may include adding a cost penalty to the cost associated with operating the vehicle in the first gear ratio to increase the cost associated with operating the vehicle in the first gear ratio so that the upshift is less desirable from a cost basis. If the control module normally initiates the upshift based on the cost of operating the vehicle in the second gear ratio vs. operating the vehicle in the first gear ratio, increasing the cost of operating the vehicle in the first gear ratio by adding the cost penalty to the cost makes it less desirable for the control module to perform the upshift, thereby making it more likely that the control module will keep the transmission in the second gear ratio, and not perform the upshift. However, when the countdown timer defines a time greater than zero and the control module applies the restriction and factors in the cost penalty into the cost of operating the vehicle in the first gear ratio, the control module may still upshift the transmission, from the second gear ratio to the first gear ratio, if the cost associated with operating the vehicle in the first gear ratio at the current speed is less than the cost associated with operating the vehicle in the second gear ratio at the current speed.

The transmission may be allowed to shift, either an upshift or a downshift, while the countdown timer defines a time greater than zero. In order to allow the transmission to perform a shift operation, a minimum speed of the vehicle that is allowable at the second gear ratio, and a maximum speed of the vehicle that is allowable at the second gear ratio, are defined, and generally indicated by box 48. The minimum speed of the vehicle that is allowable at the second gear ratio is a lower level, below which the transmission must be allowed to downshift further. The maximum speed of the vehicle that is allowable at the second gear ratio is an upper level, above which the transmission must be allowed to upshift. Accordingly, the control module determines if the speed of the vehicle is equal to or less than the minimum speed allowable at the second gear ratio, or if the speed of the vehicle is equal to or greater than the maximum speed allowable at the second gear ratio, generally indicated by box 50. When the control module determines that the speed of the vehicle is equal to or less than the minimum speed allowable at the second gear ratio, or that the speed of the vehicle is equal to or greater than the maximum speed allowable at the second gear ratio, generally indicated by at 52, then the control module may reset the countdown timer to define a time equal to zero, generally indicated by box 54. As noted above, when the countdown timer defines a time equal to zero, generally indicated by box 41, the transmission may operate as normal, and the upshifting of the transmission from the second gear ratio to the first gear ratio is not restricted. Accordingly, when the speed of the vehicle dictates, the control module over-rides the restriction to allow the transmission to shift as needed.

The control module may decide to maintain the restriction on upshifting from the second gear ratio to the first gear ratio beyond the pre-defined time. In order to maintain the restriction on upshifting, the control module resets the countdown timer to define a time equal to the pre-defined time, and restarts the countdown timer to count down from the pre-defined time to zero. When the countdown timer defines a time that is greater than zero, the control module may reset the countdown timer and restart the countdown timer when the accelerator pedal is depressed at least a maintain restriction percentage of the fully depressed position of the accelerator pedal. Accordingly, while the countdown timer defines a time that is greater than zero, generally indicated at 42, the control module continuously monitors the position of the accelerator pedal. The control module determines if the accelerator pedal is depressed to a position that is equal to or greater than the maintain restriction percentage of the fully depressed position, generally indicated by box 56. If the control module determines that the accelerator pedal is depressed to a position that is equal to or greater than the maintain restriction percentage of the fully depressed position, generally indicated at 58, then the control module resets the countdown timer to the pre-defined time, generally indicated by box 36, and restarts the countdown timer, generally indicated by box 38.

Similar to the minimum percentage, the maintain restriction percentage may include a percentage value between the range of 0% and 100%. Preferably, however, the maintain restriction percentage is between the range of 50% and 100%. For example, if the maintain restriction percentage is defined to equal a percentage value of 50%, and the control module senses the position of the accelerator pedal to determine if the accelerator pedal is depressed more than 50% of the fully depressed position, i.e., the control module determines if the accelerator pedal is depressed to a position more than halfway between the not-depressed position and the fully depressed position, or if the accelerator pedal is depressed to a position less than halfway between the not-depressed position and the fully depressed position. If the control module senses that the accelerator pedal is depressed to a position more than halfway between the not-depressed position and the fully depressed position, then the control module resets and restarts the countdown timer to continue the restriction on upshifting.

The detailed description and the drawings or FIGURE are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a transmission of a vehicle, the method comprising:
   providing a transmission control unit to control the operation of the transmission;
   detecting an occurrence of a downshift in the transmission from a first gear ratio to a second gear ratio, with the transmission control unit, wherein the first gear ratio is a higher gear ratio than the second gear ratio;
   determining if the vehicle is operating within a freeway speed range or is not operating in the freeway speed range, with the transmission control unit;
   determining if an accelerator pedal is depressed at least a minimum percentage of a fully depressed position, with the transmission control unit;
   starting a countdown timer with the transmission control unit to count down from a pre-defined time to zero, when the downshift from the first gear ratio to the second gear ratio is detected, the vehicle is operating within the freeway speed range, and the accelerator pedal is depressed at least the minimum percentage of the fully depressed position; and
   restricting an upshift of the transmission from the second gear ratio to the first gear ratio, with the transmission control unit, while the countdown timer defines a time that is greater than zero.

2. A method as set forth in claim 1 further comprising not restricting the upshift of the transmission from the second gear ratio to the first gear ratio when the countdown timer defines a time that is equal to zero.

3. A method as set forth in claim 1 further comprising defining a minimum speed of the vehicle allowable at the second gear ratio, and a maximum speed of the vehicle allowable at the second gear ratio.

4. A method as set forth in claim 3 further comprising resetting the countdown timer to define a time equal to zero when the speed of the vehicle is equal to or less than the minimum speed allowable at the second gear ratio, or the speed of the vehicle is equal to or greater than the maximum speed allowable at the second gear ratio.

5. A method as set forth in claim 1 further comprising resetting the countdown timer to define a time equal to the pre-defined time, and restarting the countdown timer to count down from the pre-defined time to zero, when the accelerator pedal is depressed at least a maintain restriction percentage of the fully depressed position of the accelerator pedal, and the countdown timer defines a time greater than zero.

6. A method as set forth in claim 5 wherein the minimum percentage includes a percentage value between the range of 0% and 100%, and wherein the maintain restriction percentage includes a percentage value between the range of 0% and 100%.

7. A method as set forth in claim 1 wherein restricting the upshift of the transmission from the second gear ratio to the first gear ratio includes initiating the upshift based upon a cost associated with operating the vehicle in the second gear ratio at a current speed of the vehicle relative to a cost associated with operating the vehicle in the first gear ratio at the current speed of the vehicle.

8. A method as set forth in claim 7 wherein restricting the upshift of the transmission from the second gear ratio to the first gear ratio includes adding a cost penalty to the cost associated with operating the vehicle in the first gear ratio at the current speed to increase the cost associated with operating the vehicle in the first gear ratio at the current speed.

9. A method as set forth in claim 8 further comprising upshifting from the second gear ratio to the first gear ratio, when the countdown timer defines a time greater than zero, if the cost associated with operating the vehicle in the first gear ratio at the current speed is less than the cost associated with operating the vehicle in the second gear ratio at the current speed.

10. A method as set forth in claim 1 further comprising sensing a speed of the vehicle.

11. A method as set forth in claim 1 further comprising sensing a position of the accelerator pedal.

12. A method as set forth in claim 1 wherein the pre-defined time is between the range of twenty minutes and ten seconds.

13. A method as set forth in claim 12 wherein the pre-defined time is between the range of two minutes and thirty seconds.

14. A method of operating a vehicle, the method comprising:
 providing a transmission control unit to control the operation of a transmission;
 setting a countdown timer, with the transmission control unit, to define a time equal to zero;
 detecting a downshift in a transmission from a first gear ratio to a second gear ratio, with the transmission control unit, wherein the first gear ratio is a higher gear ratio than the second gear ratio;
 continuously sensing a speed of the vehicle, with the transmission control unit;
 determining if the vehicle is operating within a freeway speed range or is not operating in the freeway speed range based upon the sensed speed of the vehicle, with the transmission control unit;
 sensing a position of an accelerator pedal, with the transmission control unit;
 determining if the accelerator pedal is depressed at least a minimum percentage of a fully depressed position based upon the sensed position of the accelerator pedal, with the transmission control unit;
 setting the countdown timer to define a time equal to a pre-defined time, with the transmission control unit, wherein the pre-defined time is a time greater than zero;
 starting the countdown timer, with the transmission control unit, to count down from the pre-defined time to zero when the downshift from the first gear ratio to the second gear ratio is detected, the vehicle is operating within the freeway speed range, and the accelerator pedal is depressed at least the minimum percentage of the fully depressed position;
 restricting an upshift of the transmission from the second gear ratio to the first gear ratio, with the transmission control unit, while the countdown timer defines a time that is greater than zero; and
 not restricting the upshift of the transmission from the second gear ratio to the first gear ratio when the countdown timer defines a time that is equal to zero.

15. A method as set forth in claim 14 further comprising defining a minimum speed of the vehicle allowable at the second gear ratio, and a maximum speed of the vehicle allowable at the second gear ratio.

16. A method as set forth in claim 15 further comprising resetting the countdown timer to define a time equal to zero when the speed of the vehicle is equal to or less than the minimum speed allowable at the second gear ratio, or the speed of the vehicle is equal to or greater than the maximum speed allowable at the second gear ratio.

17. A method as set forth in claim 14 further comprising resetting the countdown timer to define a time equal to the pre-defined time, and restarting the countdown timer to count down from the pre-defined time to zero, when the accelerator pedal is depressed at least a maintain restriction percentage of the fully depressed position of the accelerator pedal, and the countdown timer defines a time greater than zero.

18. A method as set forth in claim 14 wherein restricting the upshift of the transmission from the second gear ratio to the first gear ratio includes initiating the upshift based upon a cost associated with operating the vehicle in the second gear ratio at a current speed of the vehicle relative to a cost associated with operating the vehicle in the first gear ratio at the current speed of the vehicle.

19. A method as set forth in claim 18 wherein restricting the upshift of the transmission from the second gear ratio to the first gear ratio includes adding a cost penalty to the cost associated with operating the vehicle in the first gear ratio at the current speed to increase the cost associated with operating the vehicle in the first gear ratio at the current speed.

20. A method as set forth in claim 19 further comprising upshifting from the second gear ratio to the first gear ratio, when the countdown timer defines a time greater than zero, if the cost associated with operating the vehicle in the first gear ratio at the current speed is less than the cost associated with operating the vehicle in the second gear ratio at the current speed.

* * * * *